(12) United States Patent
Yang et al.

(10) Patent No.: US 7,599,825 B2
(45) Date of Patent: Oct. 6, 2009

(54) SHOULDER BED EFFECTS REMOVAL

(75) Inventors: Jian Yang, Sugar Land, TX (US); Dzevat Omeragic, Lexington, MA (US); Chengbing Liu, Katy, TX (US); Qiming Li, Sugar Land, TX (US); Jan W. Smits, Sugar Land, TX (US); Yanqing Zeng, Katy, TX (US); Helene C. Climent, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 574 days.

(21) Appl. No.: 11/279,203

(22) Filed: Apr. 10, 2006

(65) Prior Publication Data

US 2006/0235619 A1  Oct. 19, 2006

Related U.S. Application Data

(60) Provisional application No. 60/672,302, filed on Apr. 18, 2005.

(51) Int. Cl.
  *G06G 7/48*  (2006.01)
  *G01V 3/18*  (2006.01)
  *G01V 3/00*  (2006.01)

(52) U.S. Cl. .............................. 703/10; 166/339; 702/2; 702/6

(58) Field of Classification Search .................... 703/10; 702/2, 6, 7, 10; 166/336, 368
See application file for complete search history.

(56) References Cited

U.S. PATENT DOCUMENTS

| | | | |
|---|---|---|---|
| 5,869,968 A * | 2/1999 | Brooks et al. ............... | 324/338 |
| 5,889,729 A | 3/1999 | Frenkel et al. | |
| 6,018,497 A | 1/2000 | Gunasekera | |
| 6,430,509 B1 | 8/2002 | Yin et al. | |
| 6,553,314 B2 | 4/2003 | Kriegshauser et al. | |
| 2003/0018434 A1 | 1/2003 | Kriegshauser et al. | |
| 2003/0200029 A1 | 10/2003 | Omeragic et al. | |
| 2005/0083161 A1 * | 4/2005 | Minerbo et al. ............. | 336/132 |
| 2005/0165553 A1 * | 7/2005 | Jammes et al. ................ | 702/11 |

OTHER PUBLICATIONS

J. Yang et al., "Bed-Boundary Effect Removal to Aid Formation Resistivity Interpretation from LWD Propagation Measurements at all Dip Angles," SPWLA 46th Annual Logging Symposium, Jun. 26-29, 2005.

* cited by examiner

*Primary Examiner*—Paul L Rodriguez
*Assistant Examiner*—Andre Pierre Louis
(74) *Attorney, Agent, or Firm*—Darla Fonseca; Brigitte Echols; Dale Gaudier

(57) ABSTRACT

Various technologies for removing shoulder-bed effects from measurements of an earth formation made in a wellbore. In one implementation, a methodology for removing the shoulder-bed effects includes receiving the measurements and constructing a layered model of the earth formation. Each layer has a set of parameters corresponding to one or more types of the received measurements ascribed to each layer such that the set of parameters define a parameter space for the layered model. The methodology may further include dividing the parameter space into subspaces based on relationships among the parameters, selecting from the subspaces one or more starting points, minimizing a cost function using the one or more starting points to generate one or more candidate solutions having the shoulder-bed effects removed and selecting a final solution from the one or more candidate solutions.

28 Claims, 6 Drawing Sheets

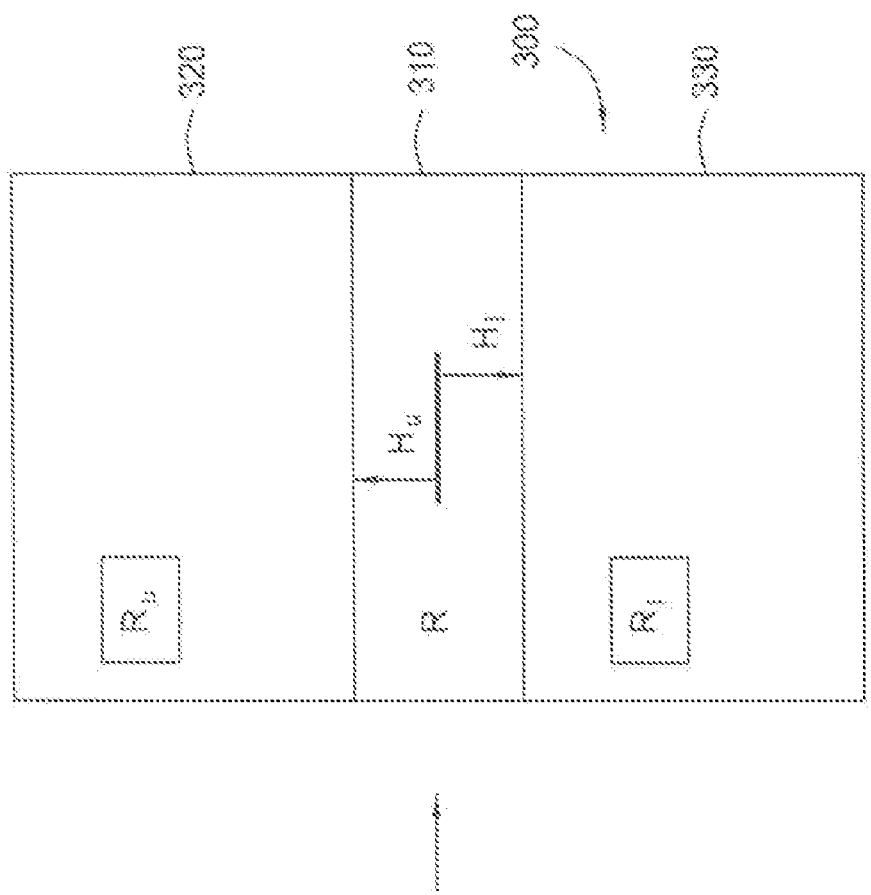
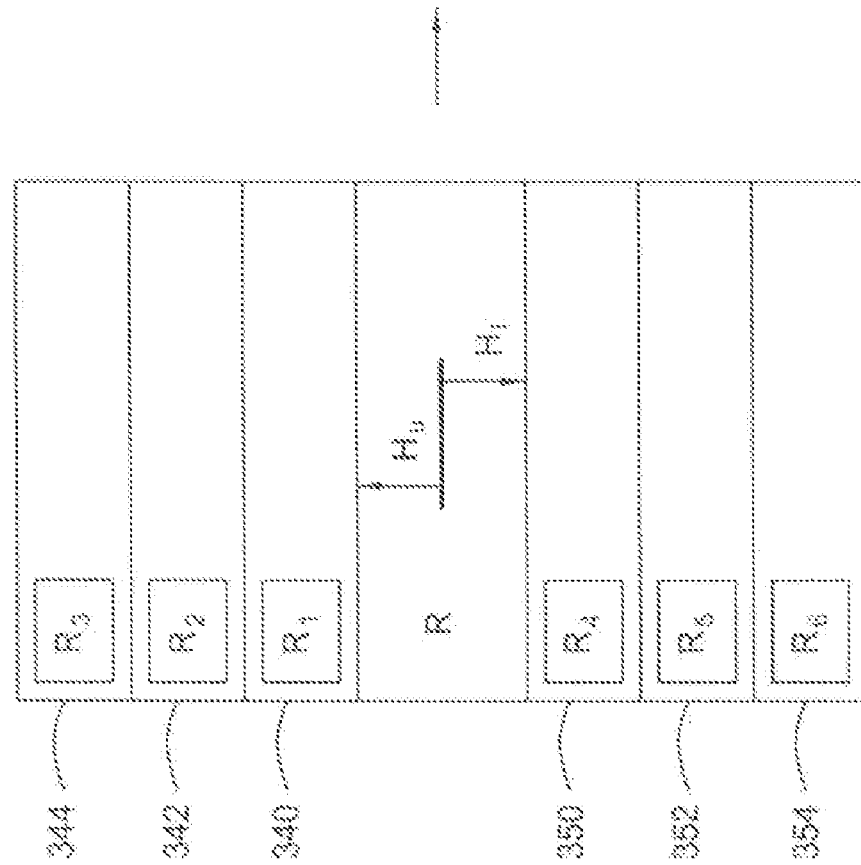

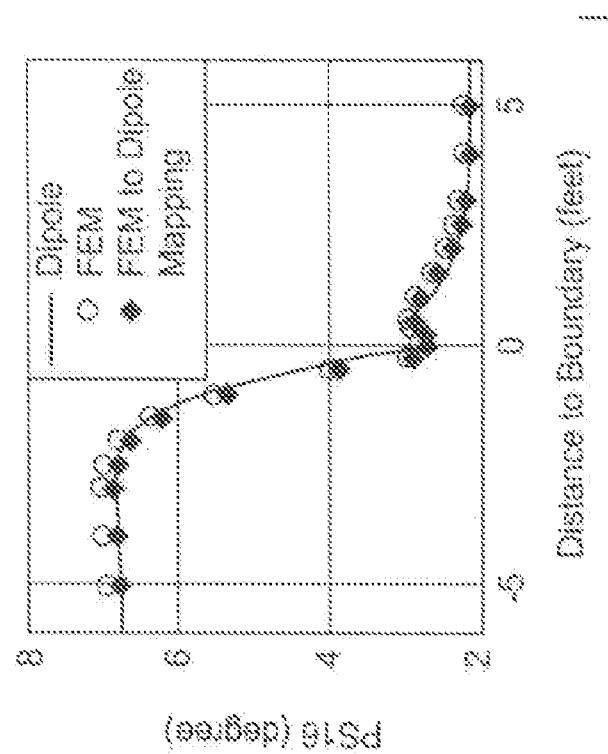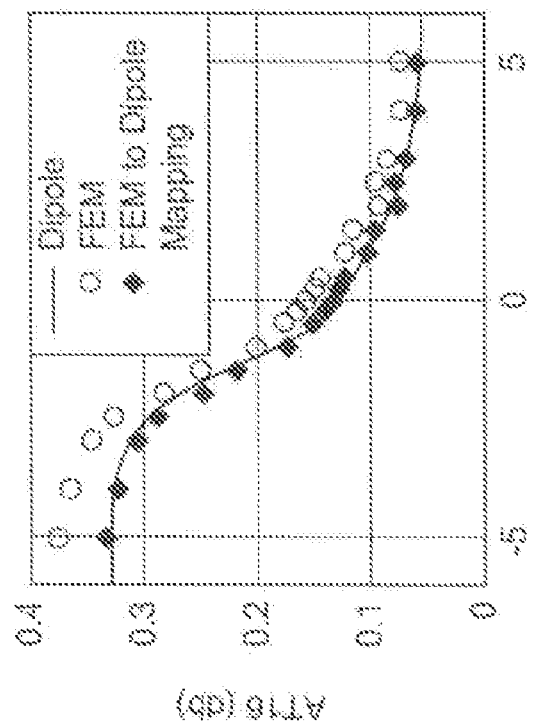
FIG. 5

SHOULDER BED EFFECTS REMOVAL

This application claims the benefit of the filing date of U.S. Provisional Patent Application No. 60/672,302 filed Apr. 18, 2005, the disclosure of which is incorporated herein by reference.

BACKGROUND

1. Field of the Invention

Implementations of various technologies described herein generally relate to interpreting data obtained with well logging tools.

2. Description of the Related Art

The following descriptions and examples are not admitted to be prior art by virtue of their inclusion within this section.

Determining the porosity and fluid content of subsurface earth formations are critical elements in maximizing the efficiency of oil, gas, and water ("formation fluids") exploration. In order to improve formation fluids exploration, drilling, and production operations, it may be necessary to gather as much information as possible on the properties of the underground earth formations as well as the environment in which drilling takes place.

The collection of downhole information, also referred to as logging, may be realized in different ways. A well tool, having sources and sensors for measuring various parameters, may be lowered into the borehole on the end of a cable, or wireline. The cable, which may be attached to a mobile processing center at the surface, is the means by which parameter data is sent up to the surface. With this type of "wireline" logging, it becomes possible to measure borehole and formation parameters as a function of depth, i.e., while the tool is conveyed along the wellbore.

An improvement over wireline logging techniques is the collection of data on downhold conditions during the drilling process. By collecting and processing such information during the drilling process, the driller can modify or correct key steps of the operation to optimize performance and avoid financial injury due to well damage, such as collapse or fluid loss. Formation information collected during drilling also tends to be less affected by the drilling fluid ("drilling mud") invasion processes or other undesirable influences as a result of borehole penetration, and therefore are closer to the properties of the virgin formation.

Schemes for collecting data of downhole conditions and movement of the drilling assembly during the drilling operation may be known as measurement-while-drilling (MWD) techniques. Similar techniques focusing more on measurement of formation parameters than on movement of the drilling assembly may be known as logging-while-drilling (LWD). However, the terms MWD and LWD are often used interchangeably, and use of either term herein includes both the collection of formation and borehole information, as well as data on movement of the drilling assembly. Other logging operations may be carried out using coiled tubing, slick lines, logging-while-tripping, and permanent monitoring applications as known in the industry.

MWD or LWD logging tools can provide an extensive set of measurements that contain valuable information on underground earth formations and environmental parameters. In most cases, interpretation of the information is necessary to extract the useful information. The raw data may be affected to varying degrees by effects such as borehole effect, tool eccentricity, invasion, anisotropy, shoulder-bed effects, and the like.

A shoulder bed refers to a formation layer above or below the layer being measured by a logging tool. The term is used in particular in resistivity logging to describe the layers above and below a formation. Some resistivity tools, such as induction and propagation tools, can sense beds located tens of feet from the measure point and can be significantly affected by shoulder beds, even when the reservoir is thick.

SUMMARY

Described here are implementations of various technologies for removing shoulder-bed effects from measurements of an earth formation made in a wellbore. In one implementation, a methodology for removing the shoulder-bed effects includes receiving the measurements and constructing a layered model of the earth formation. Each layer has a set of parameters corresponding to one or more types of the received measurements ascribed to each layer such that the set of parameters define a parameter space for the layered model. The methodology may further include dividing the parameter space into subspaces based on relationships among the parameters, selecting from the subspaces one or more starting points, minimizing a cost function using the one or more starting points to generate one or more candidate solutions having the shoulder-bed effects removed and selecting a final solution from the one or more candidate solutions.

In another implementation, each layer may have five parameters corresponding to one or more types of the received measurements ascribed to each layer such that the five parameters define a five dimensional parameter space for the layered model. The five dimensional parameter space may be divided into subspaces based on relationships among the five parameters.

In yet another implementation, each layer may have six parameters corresponding to one or more types of the received measurements ascribed to each layer such that the six parameters define a six dimensional parameter space for the layered model. The six dimensional parameter space may be divided into subspaces based on relationships among the six parameters.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3A illustrates an earth formation model having multiple layers and FIG. 3B shows an effective representation of that model using three layers in accordance with implementations of various technologies described herein.

FIG. 5 illustrates examples of attenuation and phase shift plots in which comparisons are made between a theoretical dipole model, a finite element model representing tool measurements, and the equivalent dipole measurement adjusted by a finite element-to-dipole mapping function.

DETAILED DESCRIPTION

As used here, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

Figure 1:
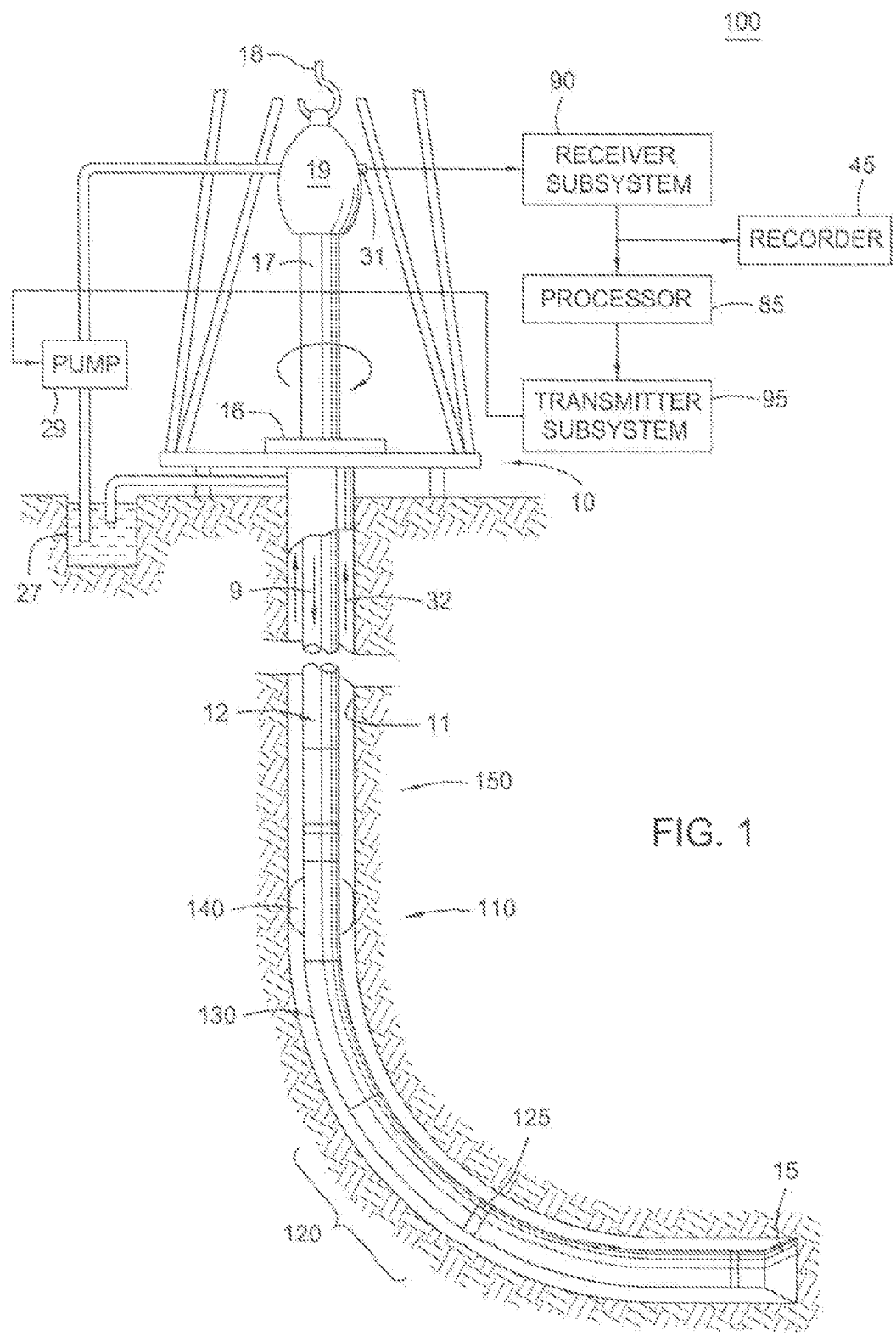
FIG. 1 illustrates a drilling environment that may be used in connection with various implementations of those technologies.

Implementations of various technologies described herein are directed to removal of shoulder-bed effects from earth formation measurements. FIG. 1 illustrates a drilling environment 100 that may be used in connection with various implementations of those technologies. In one implementation, the drilling environment 100 may include a drilling rig 10 positioned over a wellbore 11. A drilling tool assembly, which may include a drill string 12 and a drill bit 15 coupled to the lower end of drill string 12, may be disposed in wellbore 11. Drill string 12 and bit 15 may be rotated by a kelly 17 coupled to the upper end of drill string 12. The kelly 17 may be rotated by engagement with a rotary table 16 disposed on the rig 10. The kelly 17 and the drill string 12 may be suspended by a hook 18 coupled to the kelly 17 by a rotatable swivel 19.

Drilling fluid may be stored in a pit 27 and may be pumped through the center of drill string 12 by a mud pump 29 to flow downwardly (shown by arrow 9). After circulation through bit 15, the drilling fluid may circulate upwardly (indicated by arrow 32) through an annular space between wellbore 11 and drill string 12. Flow of the drilling mud may lubricate and cool bit 15 and lift drill cuttings made by bit 15 to the surface for collection and disposal.

A bottom hole assembly 110 may be connected to drill string 12. The bottom hole assembly 110 may include a stabilizer 140 and a drill collar 130, which may be coupled to a local measuring device 120. The bottom hole assembly 110 may include an antenna 125 for electromagnetic communication with the local measuring device 120. The bottom hole assembly 110 may also include a communications system 150, such as a pressure modulation (mud pulse) telemetry system. Pressure modulation telemetry can include various techniques for selectively modulating the flow (and consequently the pressure) of the drilling mud. The drilling string can also comprise wired drill pipes that support high-speed telemetry between the surface and downhole tools.

A transducer 31 disposed at the earth's surface may be configured to detect pressure variations and to conduct signals to a receiver decoder system 90 for demodulation and interpretation. The demodulated signals may be forwarded to a processor 85 and a recorder 45 for further processing. The surface equipment may optionally include a transmitter subsystem 95, which may include a pressure modulation transmitter (not shown) that can modulate the pressure of the drilling mud circulating downwardly to communicate control signals to the bottom hole assembly 110. It should be understood that the mud telemetry described above is one example of a communication means. Other telemetry systems known in the art may also be used.

The communications system 150 may also include various types of processors and controllers (not shown) for controlling the operation of sensors disposed therein, for communicating command signals to the local measuring device 120, and for receiving and processing measurements transmitted from the local measuring device 120. Sensors in bottom hole assembly 110 and/or communications system 150 may include magnetometers, accelerometers and the like.

Various instruments disposed in the bottom hole assembly 110, the communications system 150, and the local measuring device 120 may be referred to collectively as a logging-while-drilling (LWD) tool or measurement-while-drilling (MWD) tool. The bottom hole assembly 110, the processor 85, and/or the communications system 150 may include various forms of data storage or memory that can store measurements made by any or all of the sensors, including sensors disposed in the local measuring device 120, for later processing as drill string 12 is withdrawn from wellbore 11. In one implementation, the LWD or MWD tool may be a propagation resistivity tool. As such, the bottom hole assembly 110, the communications system 150, and the local measuring device 120 may be used to obtain well log data, which may include phase-shift and attenuation data obtained from various transmitter-receiver pairs and at multiple frequencies. Such data may be communicated to the surface while the LWD or MWD tool is downhole or stored in the LWD or MWD tool for later readout. Once the well log data have been obtained, the log data may be corrected for shoulder-bed effects in accordance with implementations of various technologies described herein, as described in the following paragraphs.

Unlike vertical well situations in which corrections can be made at the center location of the bed with knowledge of the thickness and resistivities of the shoulder beds, the shoulder-bed effects in horizontal wells pose a unique challenge to inversion algorithms. A formation of interest may consist of layered structures, and as a result, many of the formation layers surrounding the well may contribute to the tool measurements. Therefore, the number of unknowns may far exceed the number of independent measurements, resulting in an ill-defined problem.

Figure 2:
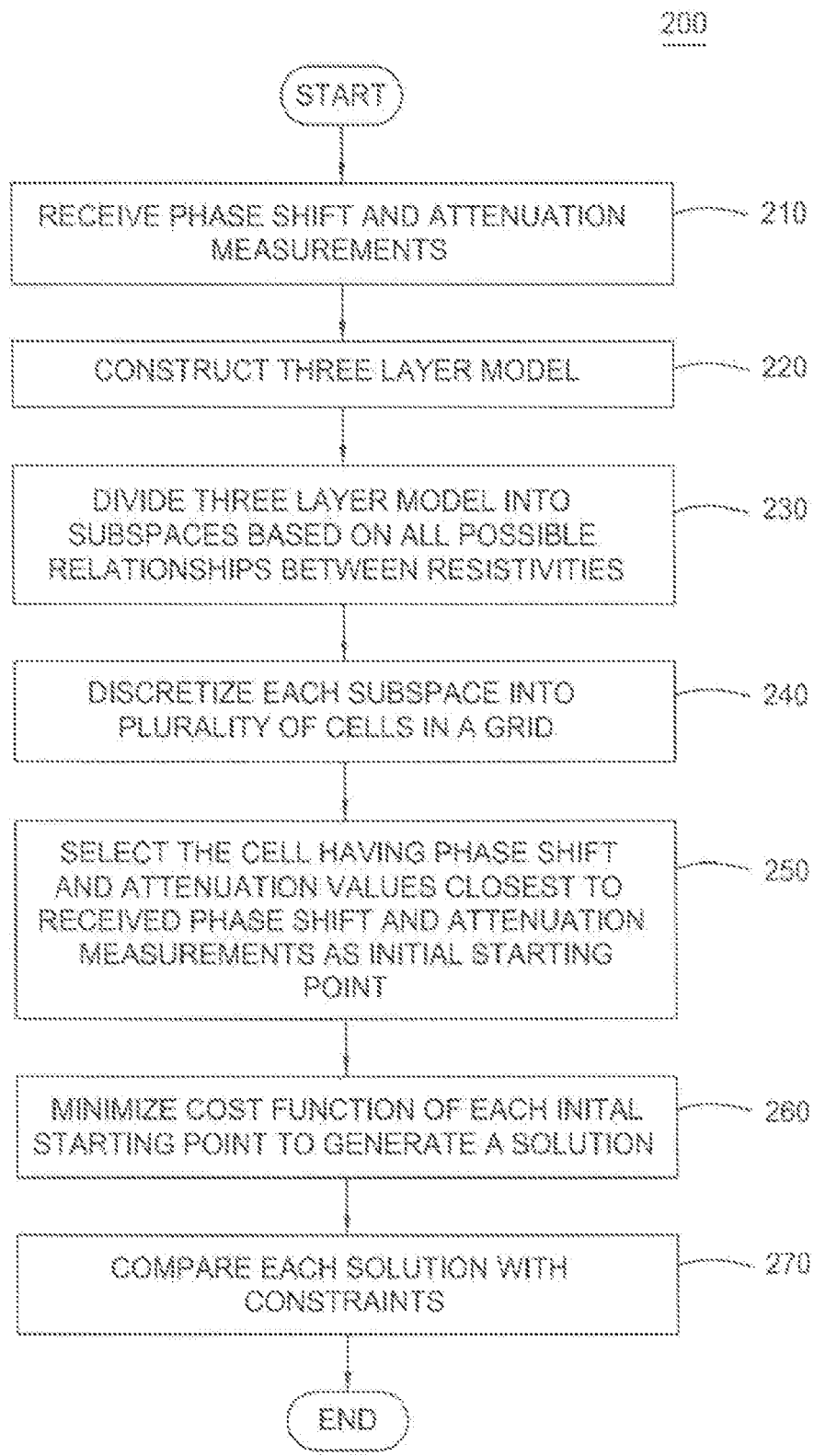
FIG. 2 illustrates a flow diagram of a method for removing shoulder-bed effects in accordance with implementations of various technologies described herein.

FIG. 2 illustrates a flow diagram of a method 200 for removing shoulder-bed effects in accordance with implementations of various technologies described herein. At step 210, well log data are received as input from the user. In one implementation, the well log data may include propagation measurements, such as phase-shift and attenuation measurements. As an example, in one implementation of an LWD tool, about ten phase-shift and attenuation measurements may be received for each frequency used to obtain the measurements. Although various implementations are described herein with reference to ten phase-shift and attenuation measurements, it should be understood that some implementations may use fewer or more than ten phase-shift and attenuation measurements. Though multiple frequencies are commonly used, the phase-shift and attenuation data may be measured, for example, at a frequency of about 2 MHz. Although the phase-shift and attenuation data may described herein as being measured at about 2 MHz frequency, it should be understood that in some implementations the phase-shift and attenuation data may be measured at any frequency ranging from about 1 kHz to about 2 GHz. In addition to the phase-shift and attenuation data, the dip angle may be included as user input. Further, although various implementations are described herein with refernce to phase-shift and attenuation measurements, it should be understood that some implementations may use other types of well log data, such as neutron logging data, gamma-ray data, seismic data, nuclear magnetic resonance data, electromagnetic propagation, induction, and dielectric permittivity data, acoustic data, and the like.

FIG. 3A shows a multilayered earth formation model. In general terms, there may be m layers above the layer in which measurements are made and n layers below that layer, where m and n are non-negative integers. The scope of the present invention includes such formation models and the contribution of each layer to the shoulder-bed effect can be considered and removed. For ease of discussion, the description below is directed to a three layer representative model as shown in FIG. 3B. In addition, the description is directed to a resistivity tool, such as a propagation resistivity tool in which the relevant parameters include resistivities and various distances from the tool to particular boundaries, but the invention is not limited to such three layer models, nor is it limited merely to resistivity tools and their associated parameters.

At step 220, a three earth formation layer model is constructed for the formation of interest. FIG. 3B illustrates a three earth formation layer model 300 in accordance with implementations of various technologies described herein. In one implementation, the three layer model 300 may include a formation layer 310 from which phase-shift and attenuation data are measured, i.e., the resistivity tool may be disposed inside the formation layer 310. The formation layer 310 may have a resistivity R. The three layer model 300 may further include an upper formation layer 320, which may be configured to represent one or more formation layers above the formation layer 310. In FIG. 3B, the upper formation layer 320 is displayed as representing formation layers 340, 342, and 344, each having resistivity $R_1$, $R_2$, and $R_3$, respectively. As such, the upper formation layer 320 has an effective resistivity $R_u$. In this manner, formation layers above the formation layer 310 may be approximated as one effective layer. The three layer model 300 may further include a lower formation layer 330, which may be configured to represent one or more formation layers below the formation layer 310. In FIG. 3B, the lower formation layer 330 is displayed as representing formation layers 350, 352, and 354, each having resistivity $R_4$, $R_5$, and $R_6$, respectively. As such, the lower formation layer 330 has an effective resistivity $R_l$. In this manner, formation layers below the formation layer 310 may be approximated as one effective layer. In one implementation, each of the upper formation layer 320 and the lower formation layer 330 may be half-spaced. The upper formation layer 320 may also be referred to as the upper shoulder of the formation layer 310 and the lower formation layer 330 may also be referred to as the lower shoulder of the formation layer 310. The formation layer 310 may also include $H_u$, which refers to the distance from the tool to the upper boundary, and $H_l$, which refers to the distance from the tool to the lower boundary. In this manner, the formation of interest having many layers and resistivities may be simplified to a three layer model having only five known parameters: R, $R_u$, $R_l$, $H_u$, and $H_l$. As such, the three layer model may include a parameter space defined by the five unknown parameters. Such parameter space may be referred to as a five-dimensional space.

Although various implementations are described herein with reference to a three layer model, it should be understood that some implementations may use a two layer model having only one boundary separating two half-spaces. The measurement tool may be disposed in one of two half-spaces. The two layer model may be applicable where the formation layer in which the measurement tool is disposed is relatively thick and the measurement tool is closer to one of the boundaries, thereby permitting a view of substantially only one boundary, i.e., the measurements may be sensitive to only one shoulder bed. Some implementations may use a homogeneous model, i.e., a one layer model with no shoulder-bed effect.

To find a three layer model that generates tool responses that match the measured log, an inversion technique is applied, as is well known in the art. Common to all nontrivial inversion problems, local minimums are generally the main obstacle to finding the true solution. Selecting as many diverse starting points as possible can increase the likelihood of finding the true solution. However, providing too many starting points for the inversion to operate on may increase computation unnecessarily. Accordingly, implementations of various technologies described herein are directed to constructing initial starting points such that they cover all possible relationships between the unknown parameters in an optimal way.

At step 230, the parameter space of the three layer model may be divided into subspaces based on all possible relationships between the selected parameters: in this example, the resistivities of each layer. Based on R, $R_u$, $R_l$, the three layer model may be configured to four resistivity relationships, which are shown below.

1) The resistivity of formation layer 310 is more than the resistivity of both the upper formation layer 320 and the lower formation layer 330, i.e., $R>R_u$ and $R>R_l$.
2) The resistivity of formation layer 310 is less than the resistivity of both the upper formation layer 320 and the lower formation layer 330, i.e., $R<R_u$ and $R<R_l$.
3) The resistivity of formation layer 310 is more than the resistivity of upper formation layer 320 but less than the resistivity of lower formation layer 330, i.e., $R>R_u$ and $R<R_l$.
4) The resistivity of formation layer 310 is less than the resistivity of upper formation layer 320 but more than the resistivity of lower formation layer 330, i.e., $R<R_u$ and $R>R_l$.

Since there are four possible resistivity relationship configurations, the three layer isotropic model may be divided into four subspaces. Table 1 summarizes the resistivity relationships for the three layer isotropic case.

TABLE 1

Parameter Subspaces for Three Layer Isotropic Model

| Case | Relation to Upper Layer | Relation to Lower Layer |
| --- | --- | --- |
| 1 | $R > R_u$ | $R > R_l$ |
| 2 | $R < R_u$ | $R < R_l$ |
| 3 | $R > R_u$ | $R < R_l$ |
| 4 | $R < R_u$ | $R > R_l$ |

Figure 6:
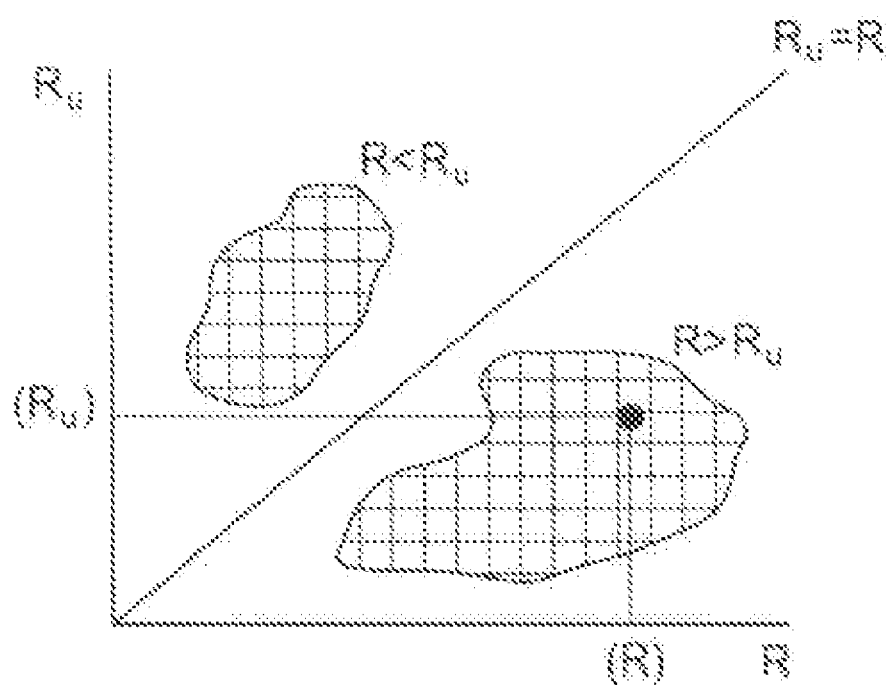
FIG. 6 illustrates a two-dimensional example of a subdivided parameter space based on resistivity relationship between two formation layers.

FIG. 6 shows how a parameter space can be subdivided. The simplified two-dimensional case for two parameters shows the first quadrant is divided by the line $R=R_u$. Points lying above the line $R=R_u$ are in the subspace $R<R_u$, and points lying below the line $R=R_u$ are in the subspace $R>R_u$.

At step 240, each subspace may be discretized into a plurality of cells in a grid. As such, the cells may also be referred to as grid points. The number of cells may depend on the number of values selected for the five unknown parameters. In one implementation, each cell may contain, for example, ten phase-shift and attenuation values that may be calculated based on the selected parameter values for that cell. Tool responses, for example, in the form of phase-shift and attenuation, are pre-calculated for each cell. The grid may also be referred to as a "two-response" table, since it is a table of two responses, i.e., phase shift and attenuation.

At step 250, for each subspace, the cell having the set of phase shift and attenuation values closest to the measured phase shift and attenuation values received at step 210 is selected as an initial starting point. For example, through an efficient grid-searching mechanism, one can also search the whole subspace grid to obtain the set of parameters (grid point in parameter space) that produces responses closest to the received measurements. If there are four subspaces, four initial starting points may be selected according to step 250. Each initial starting point may correspond to the five parameter values for the selected cell in each subspace. Although various implementations are described herein with reference to one initial starting point for each subspace, it should be understood that in some implementations more tan one initial starting point may be constructed by further dividing the distance to boundary (i.e., $H_u$ and $H_l$) into two or more brackets.

At step 260, in the inversion process, a cost function for which each initial starting point is in the functional range is generated and locally minimized in the neighborhood of each starting point to generate multiple solutions that correspond to local minima in the three layer model parameter space. Choice of the form of the cost function can vary depending on the application. A common choice is the sum of the square of the difference between the measurement and predicted response at the parameter space, normalized by the known uncertainty of the measurement. In one implementation, since there are four initial starting points, four solutions may be generated. Each solution may have five corresponding parameter values. The cost function may be minimized using any cost function minimization technique, such as Gauss-Newton algorithm, Levenberg-Marquardt algorithm, simplex algorithm, simulated annealing, grid search, and the like. It should be understood that different algorithms may be better suited in different situations. For example, the Levenberg-Marquardt algorithm, which is a modified Gauss-Newton algorithm, may be an efficient and robust method for the minimization of non-quadratic objective functions. After local linearization of the objective function with respect to the parameters to be estimated, the Levenberg-Marquardt algorithm may first take small, but robust steps along the steepest descent direction. The method may later switch to the more efficient quadratic Gauss-Newton steps when approaching the minimum.

At step 270, each solution may be compared against various constraints about the formation of interest known by the user. Such constraints may include specific propagation parameter values or specific values for certain physical attributes, such as water saturation. The constraints may also specify a range of propagation parameter values or a range of values for certain physical attributes. In one implementation, the constraints may include a resistivity profile of the formation of interest. For example, the user may require the inversion program to find the best match to a predefined (e.g. staircase) resistivity profile. In another implementation, the constraints may require the distance to boundary (i.e., $H_u$ and $H_l$) of the solution to be greater than a certain value, e.g., 1 ft, if the variation rate of the resistivity curve with respect to the measured depth is less than a predefined value. The constraints may further require the solution to have a cost function, or fitting errors between the modeled response and the measurement, to be less than a specific value. In one implementation, if no solution satisfies the constraints, then the solution may be selected based on the least fit error, and a flag may be set to indicate that the inversion did not meet the requirements. Step 270 may be repeated for each solution until a satisfactory solution is selected. During each iteration, each solution may be compared against different constraints.

Although implementations of various technologies described herein are with reference to isotropic formations, it should be understood that some implementations may be applied to anisotropic formations. Referring back to step 230, the three layer model parameter space may be divided into subspaces based on all possible relationships between the resistivities. For an anisotropic formation, the formation layer 310 may have one resistivity along the horizontal plane, $R_h$, and another resistivity in the vertical axis or normal to the horizontal plane, $R_v$. Formation layers above the formation layer 310 may be approximated as the upper formation layer 320 having an effective resistivity $R_u$ and formation layers below the formation layer 310 may be approximated as the lower formation layer 330 having an effective resistivity $R_l$. As such, the three layer model may be configured to nine resistivity relationships, as shown below, assuming the vertical resistivity $R_v$ is greater than the horizontal resistivity $R_h$.

1) Both the horizontal and vertical resistivities of formation layer 310 are more than the resistivity of both the upper formation layer 320 and the lower formation layer 330, i.e., $R_h > R_u$ and $R_h > R_l$, $R_v > R_u$ and $R_v > R_l$.
2) The horizontal resistivity of formation layer 310 is less than the resistivity of both the upper formation layer 320 and the lower formation layer 330, and the vertical resistivity of formation layer 310 is more than the resistivity of both the upper formation layer 320 and the lower formation layer 330, i.e., $R_h < R_u$ and $R_h < R_l$, $R_v > R_u$ and $R_v > R_l$.
3) Both the horizontal and vertical resistivities of formation layer 310 are less than the resistivity of both the upper formation layer 320 and the lower formation layer 330, i.e., $R_h < R_u$ and $R_h < R_l$, $R_v < R_u$ and $R_v < R_l$.
4) The horizontal resistivity of formation layer 310 is less than the resistivity of both the upper formation layer 320 and the lower formation layer 330, and the vertical resistivity of formation layer 310 is more than the resistivity of the upper formation layer 320 but less than the resistivity of the lower formation layer 330, i.e., $R_h < R_u$ and $R_h < R_l$, $R_v > R_u$ and $R_v < R_l$.
5) The horizontal resistivity of formation layer 310 is less than the resistivity of both the upper formation layer 320 and the lower formation layer 330, and the vertical resistivity of formation layer 310 is less than the resistivity of the upper formation layer 320 but more than the resistivity of the lower formation layer 330, i.e., $R_h < R_u$ and $R_h < R_l$, $R_v < R_u$ and $R_v > R_l$.
6) The horizontal resistivity of formation layer 310 is more than the resistivity of the upper formation layer 320 but less than the resistivity of the lower formation layer 330, and the vertical resistivity of formation layer 310 is more than the resistivity of both the upper formation layer 320 and the lower formation layer 330, i.e., $R_h > R_u$ and $R_h < R_l$, $R_v > R_u$ and $R_v > R_l$.
7) The horizontal resistivity of formation layer 310 is more than the resistivity of upper formation layer 320 but less than the resistivity of the lower formation layer 330, and the vertical resistivity of formation layer 310 is more than the resistivity of the upper formation layer 320 but less than the resistivity of the lower formation layer 330, i.e., $R_h>R_u$ and $R_h<R_l$, $R_v>R_u$ and $R_v<R_l$.

8) The horizontal resistivity of formation layer 310 is less than the resistivity of the upper formation layer 320 but more than the resistivity of the lower formation layer 330, and the vertical resistivity of formation layer 310 is more than the resistivity of both the upper formation layer 320 and the lower formation layer 330, i.e., $R_h<R_u$ and $R_h>R_l$, $R_v>R_u$ and $R_v>R_l$.

9) The horizontal resistivity of formation layer 310 is less than the resistivity of the upper formation layer 320 but more than the resistivity of the lower formation layer 330, and the vertical resistivity of formation layer 310 is less than the resistivity of the upper formation layer 320 but greater than the resistivity of the lower formation layer 330, i.e., $R_h<R_u$ and $R_h>R_l$, $R_v<R_u$ and $R_v>R_l$.

Since there are nine possible resistivity relationship configurations, the three layer anisotropic model may be divided into nine subspaces. Table 2 summarizes the resistivity relationships for the three layer anisotropic case.

TABLE 2

Parameter Subspaces for Three Layer Anisotropic Model

| Case | Rh | | Rv | |
|---|---|---|---|---|
| 1 | $R_h>R_u$ | $R_h>R_l$ | $R_v>R_u$ | $R_v>R_l$ |
| 2 | $R_h<R_u$ | $R_h<R_l$ | $R_v>R_u$ | $R_v>R_l$ |
| 3 | | | $R_v<R_u$ | $R_v<R_l$ |
| 4 | | | $R_v>R_u$ | $R_v<R_l$ |
| 5 | | | $R_v<R_u$ | $R_v>R_l$ |
| 6 | $R_h>R_u$ | $R_h<R_l$ | $R_v>R_u$ | $R_v>R_l$ |
| 7 | | | $R_v>R_u$ | $R_v<R_l$ |
| 8 | $R_h<R_u$ | $R_h>R_l$ | $R_v>R_u$ | $R_v>R_l$ |
| 9 | | | $R_v<R_u$ | $R_v>R_l$ |

Referring back to step 240, each subspace may be discretized into a plurality of cells on a grid. The number of cells may be based on the number of values selected for the six unknown parameters, $R_h$, $R_v$, $R_u$, $R_l$, $H_u$ and $H_l$.

Referring back to step 250, for each subspace, the cell having the phase shift and attenuation values closest to the phase-shift and attenuation measurements received at step 210 is selected as an initial starting point. In one implementation, since there are nine subspaces, nine initial starting points may be selected. Each initial starting point may correspond to the six selected parameter values for the selected cell in each subspace. Although various implementations are described herein with reference to one initial starting point for each subspace, it should be understood that in some implementations more than one initial starting point may be constructed by further dividing the distance to boundary (i.e., $H_u$ and $H_l$) into two or more brackets.

Referring back to step 260, the cost function for each initial starting point may be minimized to generate a solution. In one implementation, since there are nine initial starting points, nine solutions may be generated. Each solution may have six corresponding parameter values. Referring back to step 270, each solution may be compared against various constraints about the formation of interest known by the user.

Figure 4A:
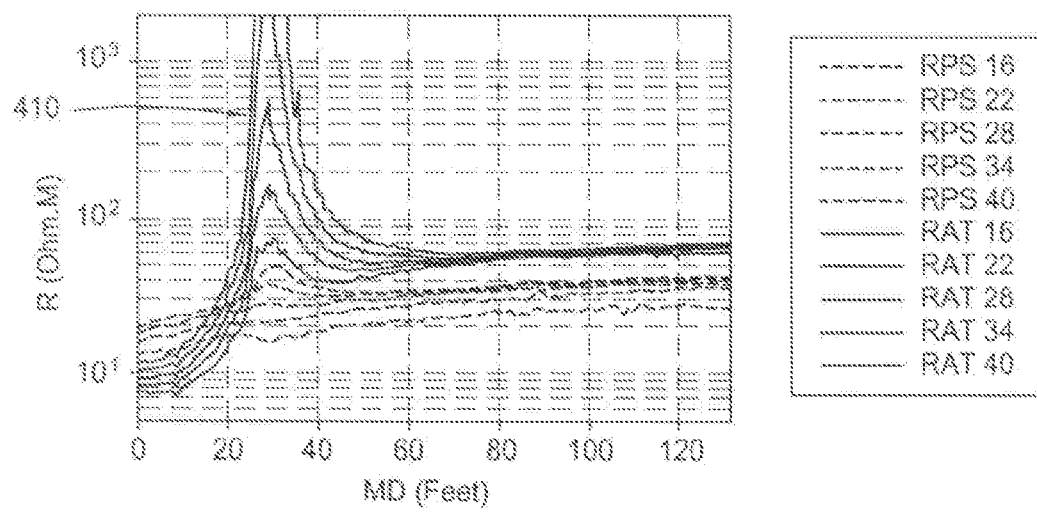
FIG. 4A illustrates an example of shoulder-bed effects on various resistivity curves of phase shift and attenuation for different transmitter/receiver spacings.
Figure 4B:
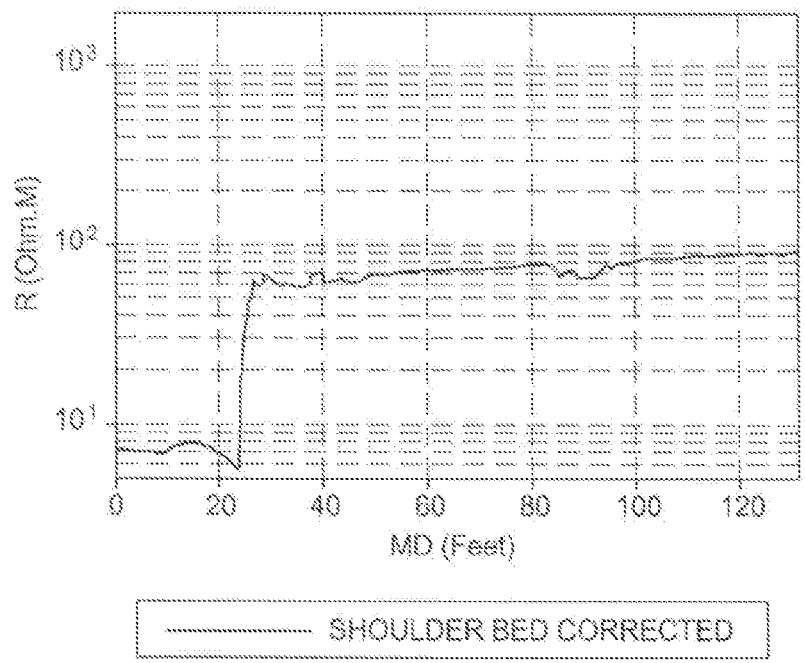
FIG. 4B illustrates an example of shoulder-bed effects removed from the log of FIG. 4A based on implementations of various technologies described herein.

In the above referenced manner, implementations of various technologies described herein may be used to remove shoulder-bed effects from resistivity measurements. FIGS. 4A and 4B illustrate an example of such shoulder-bed effects removal from resistivity measurements. More specifically, FIG. 4A illustrates a set of 2 MHz resistivity curves measured using an array LWD resistivity tool in a section of a well with a relative deviation of 86 degrees. Polarization horns 410 and large curve separations are clearly visible in the log. FIG. 4B illustrates the resistivity curve after the shoulder-based effects have been removed using various implementations described herein. The removal of the polarization horns 410 as well as the stepwise shape in the resistivity curve demonstrates the significant improvement in the formation resistivity log.

Typically, interpretation uses a simpler and more efficient model than the full model of the tool. For example, for an electromagnetic tool, a dipole model is frequently used for interpretation because of its simplicity and speed of computation. Therefore, it may be necessary to map the original tool measurement in phase-shift and attenuation to values consistent with what a dipole model would produce in the same formation. Such a process facilitates more accurate formation evaluation. FIG. 5 shows the phase-shift and attenuation of a propagation resistivity tool in a two-layered structure (20 ohm-m to 2 ohm-m) at different distances to the boundary. The FEM plot represents the tool measurements (i.e., before the mapping), and the dipole plot shows the predicted tool response for a dipole tool model in the same formation. The FEM-to-dipole mapping plot shows the FEM data mapped to the dipole model, and it represents the response the tool would produce if the tool were a perfect dipole. For the inversion to produce reliable results, the phase-shift and attenuation after the mapping should agree with the dipole model response. Thus, the present invention may include a step that maps the original measurements into equivalent values to compute the response of the tool. In one implementation, the mapping operation transforms the measurement values to a set of corresponding values that would be obtained if the measurements were made in a homogenous earth formation.

Implementations of various technologies described herein may be used to treat resistivity measurements in high angle wells, horizontal wells, low angle wells, and vertical wells. Further implementations of various technologies described herein may be used in connection with various implementations for identifying and correcting for environmental effects described in commonly assigned U.S. Pat. No. 6,832,159, which is incorporated herein by reference. Further, various implementations described herein may be carried out downhole (e.g., in an LWD or MWD tool), at the well surface, or at any remote location as desired.

In addition, various technologies described herein may be implemented in program instructions, which may be stored in a computer readable medium, such as any memory associated with the bottom hole assembly 110, the processor 85, and/or the communications system 150. Such program instructions may be executed by a processor, such as the processor 85 shown in FIG. 2. The program instructions may be written in a computer programming language, such as C++, Java, and the like. The program instructions may be "object code," i.e., in binary form that is substantially executable directly by the computer; in "source code" that requires compilation or interpretation before execution; or in some intermediate form such as partially compiled code.

The computer-readable medium storing the program instructions may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to story the desired information and which can be accessed by a processor. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for removing shoulder-bed effects from measurements of an earth formation made in a wellbore, comprising:
executing, via a processor, program instructions capable of:
receiving the measurements;
constructing a layered model of the earth formation, wherein each layer has a set of parameters corresponding to one or more types of the received measurements ascribed to each layer such that the set of parameters define a parameter space for the layered model;
dividing the parameter space into subspaces based on relationships among the parameters;
selecting from the subspaces one or more starting points;
minimizing a cost function using the one or more starting points to generate one or more candidate solutions having the shoulder-bed effects removed; and
selecting a final solution from the one or more candidate solutions.

2. The method of claim 1 wherein the layered model comprises three layers.

3. The method of claim 2, wherein the three-layer model comprises a formation layer from which the set of measurements is obtained, an upper formation layer representing one or more formation layers above the formation layer from which the set of measurements is obtained, and a lower formation layer representing one or more formation layers below the formation layer from which the set of measurements is obtained.

4. The method of claim 1, further comprising receiving dip information and wellbore trajectory data.

5. The method of claim 1, wherein the measurements are selected from a group consisting of neutron logging data, gamma-ray data, seismic data, nuclear magnetic resonance data, electromagnetic propagation, induction, or dielectric permittivity data, and acoustic data.

6. The method of claim 1, further comprising discretizing the subspaces into a plurality of cells.

7. The method of claim 6, wherein selecting from the subspaces one or more starting points comprises pre-computing a modeled tool response for each cell and choosing the cell having the modeled tool response closest to the received measurements as a starting point.

8. The method of claim 1, further comprising mapping the measurements into corrected values that can be used in minimizing the cost function.

9. The method of claim 8, wherein the corrected values represent what an ideal tool would produce in the earth formation.

10. The method of claim 8, wherein the mapping operation transforms the measurement values to a set of corresponding values that would be obtained if the measurements were made in a homogenous earth formation.

11. The method of claim 1, wherein selecting the final solution comprises applying a set of constraints to the one or more candidate solutions.

12. The method of claim 11, wherein the constraints are physical, chemical, geological, mathematical, or mechanical.

13. The method of claim 1, wherein the earth formation is isotropic.

14. A method for removing shoulder-bed effects from measurements of an earth formation made in a wellbore, comprising:
executing, via a processor, program instructions capable of:
receiving the measurements;
constructing a layered model of the earth formation, wherein each layer has five parameters corresponding to one or more types of the received measurements ascribed to each layer such that the five parameters define a five dimensional parameter space for the layered model;
dividing the five dimensional parameter space into subspaces based on relationships among the five parameters;
selecting from the subspaces one or more starting points;
minimizing a cost function using the one or more starting points to generate one or more candidate solutions having the shoulder-bed effects removed; and
selecting a final solution from the one or more candidate solutions.

15. The method of claim 14, wherein the solution corresponds to a local minimum on the five dimensional parameter space.

16. The method of claim 14, wherein the layered model comprises three layers.

17. The method of claim 16, wherein the three-layer model comprises a formation layer from which the set of measurements is obtained, an upper formation layer representing one or more formation layers above the formation layer from which the set of measurements is obtained, and a lower formation layer representing one or more formation layers below the formation layer from which the set of measurements is obtained.

18. The method of claim 17, wherein the five dimensional parameter space is divided into subspaces based on relationships between the resistivity of the upper formation layer, the resistivity of the lower formation layer and the resistivity of the formation layer from which the set of measurements is obtained.

19. The method of claim 18, wherein the relationships comprise:
- a first relationship where the resistivity of the formation layer from which the set of measurements is obtained is more than the resistivity of the upper formation layer and the resistivity of the lower formation layer;
- a second relationship where the resistivity of the formation layer from which the set of measurements is obtained is less than the resistivity of the upper formation layer and the resistivity of the lower formation layer;
- a third relationship where the resistivity of the formation layer from which the set of measurements is obtained is more than the upper formation layer but less than the lower formation layer; and
- a fourth relationship where the resistivity of the formation layer from which the set of measurements is obtained is less than the upper formation layer but more than the lower formation layer.

20. The method of claim 14, wherein the number of subspaces is four.

21. The method of claim 14, wherein the five parameters comprise the resistivity of the formation layer from which the set of measurements is obtained, the resistivity of the upper formation layer, the resistivity of the lower formation layer, a distance to the upper boundary of the formation layer from which the set of measurements is obtained and a distance to the lower boundary of the formation layer from which the set of measurements is obtained.

22. A method for removing shoulder-bed effects from measurements of an earth formation made in a wellbore, comprising:
- executing, via a processor, program instructions capable of:
  - receiving the measurements;
  - constructing a layered model of the earth formation, wherein each layer has six parameters corresponding to one or more types of the received measurements ascribed to each layer such that the six parameters define a six dimensional parameter space for the layered model;
  - dividing the six dimensional parameter space into subspaces based on relationships among the six parameters;
  - selecting from the subspaces one or more starting points;
  - minimizing a cost function using the one or more starting points to generate one or more candidate solutions having the shoulder-bed effects removed; and
  - selecting a final solution from the one or more candidate solutions.

23. The method of claim 22, wherein the layered model comprises three layers.

24. The method of claim 22, wherein the number of subspaces is nine.

25. The method of claim 22, wherein the six parameters comprise the horizontal resistivity and the vertical resistivity of the formation layer from which the set of measurements is obtained, the resistivity of the upper formation layer, the resistivity of the lower formation layer, a distance to the upper boundary of the formation layer from which the set of measurements is obtained and a distance to the lower boundary of the formation layer from which the set of measurements is obtained.

26. The method of claim 23, wherein the three-layer model comprises a formation layer from which the set of measurements is obtained, an upper formation layer representing one or more formation layers above the formation layer from which the set of measurements is obtained, and a lower formation layer representing one or more formation layers below the formation layer from which the set of measurements is obtained.

27. The method of claim 26, wherein the six dimensional parameter space is divided into subspaces based on relationships between the resistivity of the upper formation layer, the resistivity of the lower formation layer, the horizontal resistivity and the vertical resistivity of the formation layer from which the set of measurements is obtained.

28. The method of claim 27, wherein the relationships comprise:
- a first relationship where the horizontal resistivity of the formation layer from which the set of measurements is obtained is more than the resistivity of the upper formation layer and the resistivity of the lower formation layer;
- a second relationship where the horizontal resistivity of the formation layer from which the set of measurements is obtained is less than the resistivity of the upper formation layer and the resistivity of the lower formation layer and the vertical resistivity of the formation layer from which the set of measurements is obtained is more than the resistivity of the upper formation layer and the resistivity of the lower formation layer;
- a third relationship where the horizontal resistivity of the formation layer from which the set of measurements is obtained is less than the resistivity of the upper formation layer and the resistivity of the lower formation layer and the vertical resistivity of the formation layer from which the set of measurements is obtained is more than the resistivity of the upper formation layer but less than the resistivity of the lower formation layer;
- a fourth relationship where the horizontal resistivity of the formation layer from which the set of measurements is obtained is less than the resistivity of the upper formation layer and the resistivity of the lower formation layer and the vertical resistivity of the formation layer from which the set of measurements is obtained is less than the resistivity of the upper formation layer but more than the resistivity of the lower formation layer;
- a fifth relationship where the horizontal resistivity of the formation layer from which the set of measurements is obtained is less than the resistivity of the upper formation layer and the resistivity of the lower formation layer and the vertical resistivity of the formation layer from which the set of measurements is obtained is less than the resistivity of the upper formation layer and the resistivity of the lower formation layer;
- a sixth relationship where the horizontal resistivity of the formation layer from which the set of measurements is obtained is more than the resistivity of the upper formation layer but less than the resistivity of the lower formation layer and the vertical resistivity of the formation layer from which the set of measurements is obtained is more than the resistivity of the upper formation layer and the resistivity of the lower formation layer;
- a seventh relationship where the horizontal resistivity of the formation layer from which the set of measurements is obtained is more than the resistivity of the upper formation layer but less than the resistivity of the lower formation layer and the vertical resistivity of the formation layer from which the set of measurements is obtained is more than the resistivity of the upper formation layer but less than the resistivity of the lower formation layer;
- an eighth relationship where the horizontal resistivity of the formation layer from which the set of measurements is obtained is less than the resistivity of the upper formation layer but more than the resistivity of the lower formation layer and the vertical resistivity of the formation layer from which the set of measurements is obtained is more than the resistivity of the upper formation layer and the resistivity of the lower formation layer;

a ninth relationship where the horizontal resistivity of the formation layer from which the set of measurements is obtained is less than the resistivity of the upper formation layer but more than the resistivity of the lower formation layer and the vertical resistivity of the formation layer from which the set of measurements is obtained is less than the resistivity of the upper formation layer but more than the resistivity of the lower formation layer.

* * * * *